Figure 1:
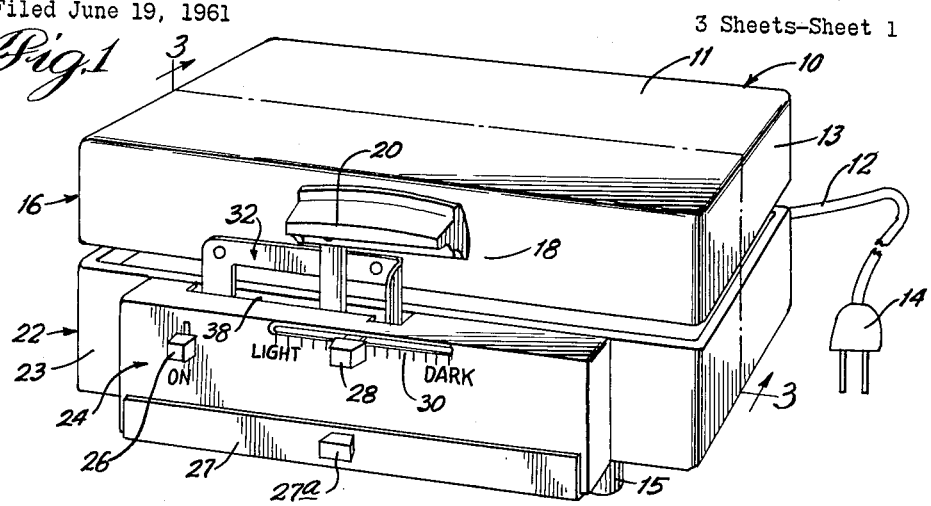

Oct. 27, 1964   A. J. HUCK   3,154,004
OVEN TOASTER
Filed June 19, 1961   3 Sheets-Sheet 1

INVENTOR:
Alfred J. Huck,
BY
Bair, Freeman & Molinare
ATTORNEYS.

Oct. 27, 1964 — A. J. HUCK — 3,154,004
OVEN TOASTER
Filed June 19, 1961 — 3 Sheets-Sheet 2

INVENTOR:
Alfred J. Huck,
BY
Bair, Freeman & Molinare
ATTORNEYS.

Oct. 27, 1964     A. J. HUCK     3,154,004
OVEN TOASTER

Filed June 19, 1961     3 Sheets-Sheet 3

INVENTOR:
Alfred J. Huck,
BY
Bair, Freeman & Molinare
ATTORNEYS.

United States Patent Office 3,154,004
Patented Oct. 27, 1964

3,154,004
OVEN TOASTER
Alfred J. Huck, St. Louis, Mo., assignor to Knapp-Monarch Company, a corporation of Delaware
Filed June 19, 1961, Ser. No. 118,068
6 Claims. (Cl. 99—390)

This invention relates in general to radiant heat cooking apparatus and more particularly to a toaster utilizing radiant heat for toasting horizontally disposed bread slices and the like.

Common practice in toasting bread slices or the like has been to deposit the bread through a slot in the top of a toaster housing. The bread is held in a vertical position on a tray or carriage within the housing, and exposed to heat radiated from electrically energized heating coils or heating elements disposed in a vertical plane parallel to the bread. When the toasting cycle is completed, the bread is simply popped up through the slot to permit access thereto. Although this arrangement is generally satisfactory, it does not permit buttered bread to be satisfactorily toasted since the butter tends to run down the sides of the bread. On the other hand, if the bread is disposed in a horizontal plane, the heating elements must be likewise disposed adjacent the bread. The butter, upon melting, then drips down upon the heating elements. This causes considerable sputter and other unpleasant effects while such elements as salt in the butter causes the heating coils to quickly deteriorate.

In solving the problem of toasting buttered bread, the present invention utilizes apparatus in which the bread is horizontally disposed, but in which the heating coils are spaced away from the perimeter of the bread slices and radiant heat reflectors are utilized to secure the proper degree of toasting. Thus, the bread is horizontally disposed to permit the even flow of the melted butter thereover, while the deleterious and unpleasant effects of having the butter or other food remnants coming into contact with the heating coils is avoided.

It is therefore an object of the present invention to provide a radiant heat toaster which permits buttered bread, buns or sandwiches and the like to be toasted in a horizontal position and in which the toasting apparatus is protected from the harmful effects normally resulting from the deposit of butter or other foot particles thereon.

Since the bread must be toasted on both sides and since it is desirable to provide a separable housing to permit the most facile deposit of the bread, one or more coils are disposed in each of the separable housing portions. Electrical connections to the coils in the respective housing portions must be provided in addition to suitable control apparatus for latching and releasing of the housing portions at certain times in the toasting cycle.

It is therefore another object of this invention to provide a horizontal bread toaster of the type described in which the electrical connections are operably responsive to the closure of the separable housing portions, and broken upon opening of the separable housing portions to remove the danger of shock hazard, and which are not subject to the usual wear during the movement of the separable portions.

It is still a further object of the present invention to provide a bread support arrangement in the described toaster that is operable to accommodate either bread, buns or sandwiches in a position wherein each is evenly toasted.

Additional objects of the present invention include the provision of apparatus that permits facile cleansing; the use of standard components to control the toasting cycle and the automatic separation of the housing portions, and the provision of proper vents to control the degree of heat accumulation and insure the proper timing of each toasting cycle.

Figure 2:
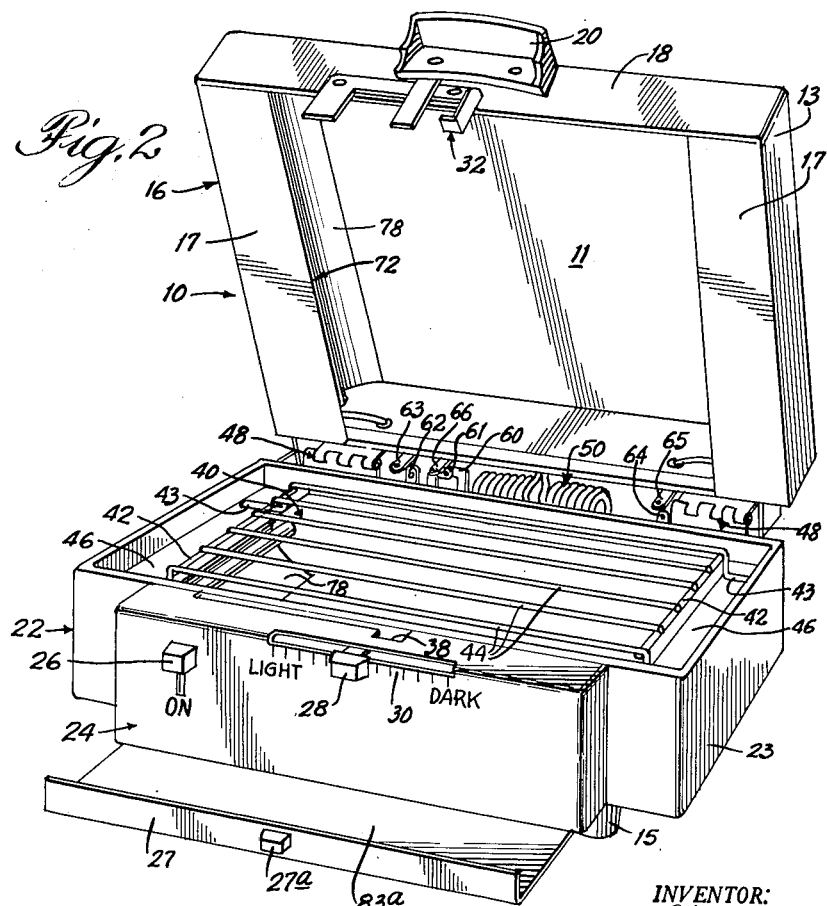
Figure 3:
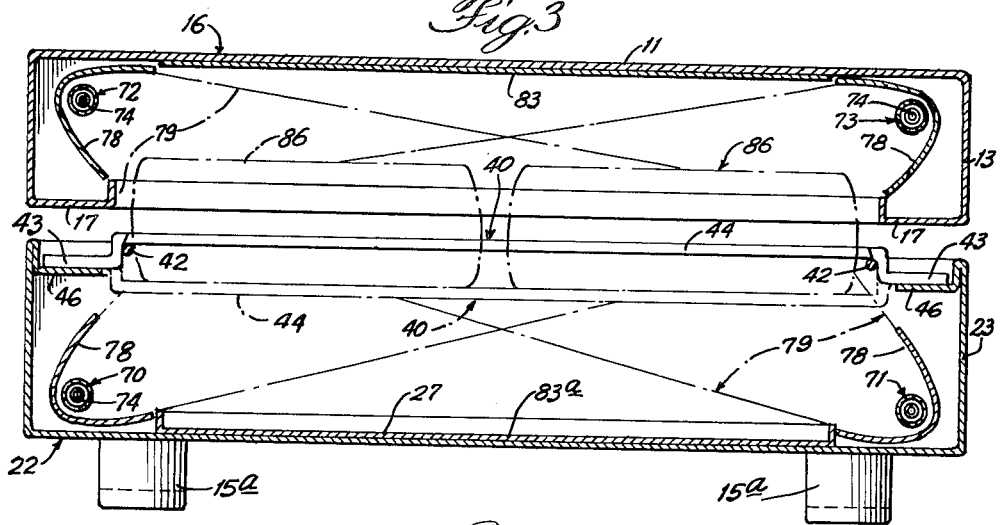
Figure 4:
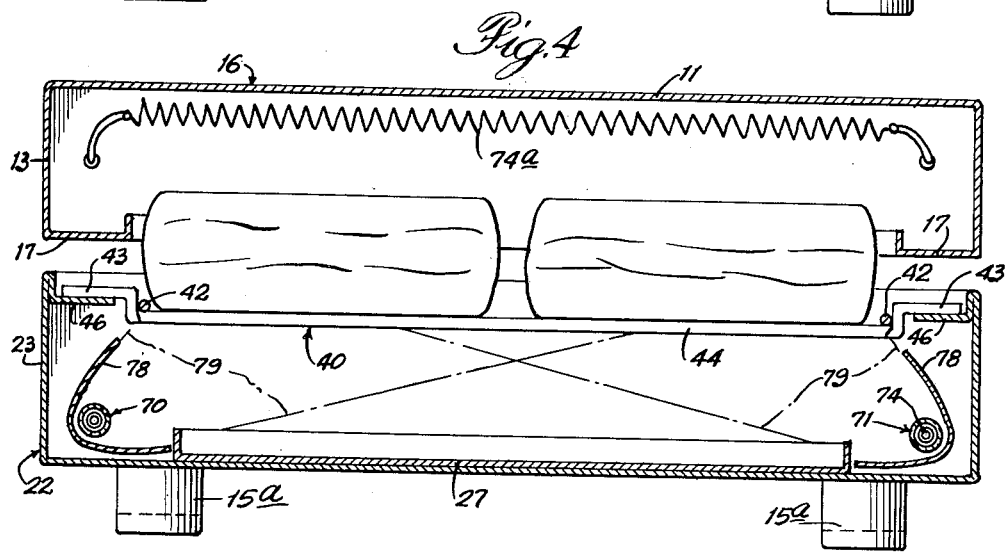
Figure 5:
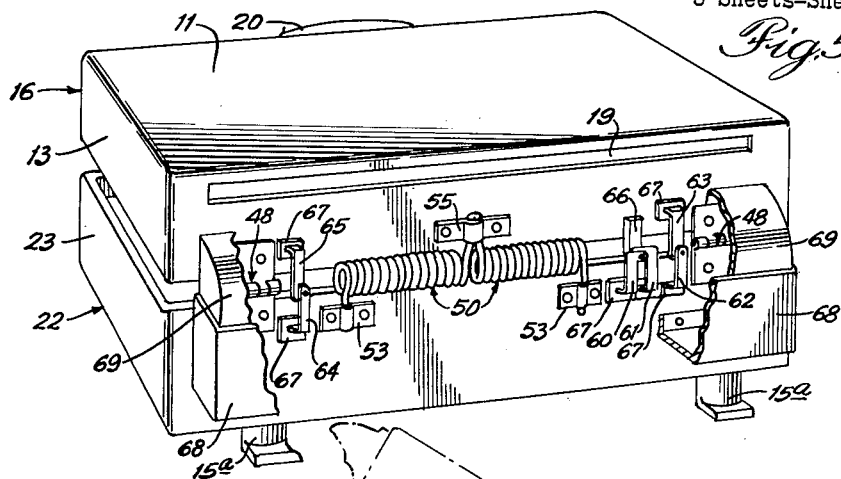
Figure 6:
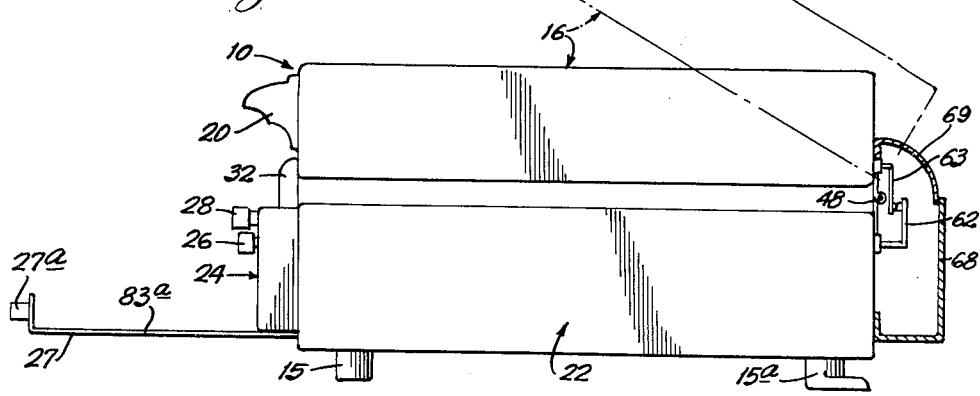
Figure 7:
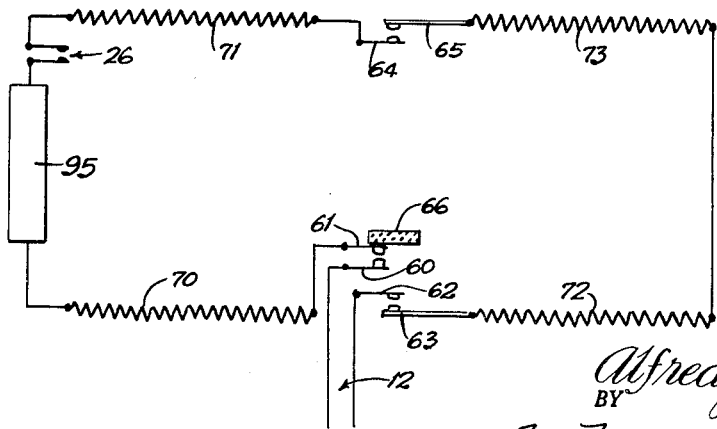

Other objects together with the features of the invention will become apparent on examination of the following specification, claims and drawings wherein:

FIGURE 1 is a perspective view of the toaster in a closed position;
FIGURE 2 is a perspective view of the toaster in an open position;
FIGURE 3 is a sectional view of the toaster taken along the line 3—3 in FIGURE 1 and in the direction of the arrows;
FIGURE 4 is a view similar to FIGURE 3 utilizing another heating coil arrangement;
FIGURE 5 is a perspective view of the rear of the toaster;
FIGURE 6 is a side plan view of the toaster; and
FIGURE 7 illustrates the electrical circuit in which the heating coils and switches are arranged.

The toaster is generally indicated by the reference character 10 in the various figures. Advantageously, it comprises an upper housing portion or shell 16 and a lower housing portion or shell 22. An electrical cable 12 and the plug 14 furnish electric power to the toaster when the plug 14 is connected to a suitable 110 volt source.

The upper shell 16 comprises a substantially flat upper wall 11 and a perimeter wall 13 which carries on its underside the pair of horizontal flanges 17, as seen in FIGURE 2. The perimeter wall 13 has a front portion 18 on which the handle 20 is carried. The handle 20, in turn, has attached thereto the latch element 32.

The latch element 32 is adapted to be engaged by any well known type of cooperating latch member within the control housing 24 carried on the forward side of the lower shell 22 when the latch element 32 is inserted through an opening 38 provided in the top wall of housing 24.

The lower shell 22 likewise comprises a flat horizontal bottom wall portion and an upright perimeter wall 23. The perimeter wall 23 is likewise provided with a pair of inwardly extending horizontal flange portions or brackets 46 formed at a predetermined level beneath the top of the lower shell 22.

A removable bread rack or grill 40 is adapted to be supported upon the flanges 46. The bread rack 40 advantageously comprises a network of longitudinal wires or rods 44 suitably joined at their opposite ends to the transverse wires or rods 42. The front and back longitudinal rods 44 are slightly longer than the others and are provided with respective L-shaped bends 43 which permit the rack 40 to be supported at a suitable distance above the brackets 46 or below the brackets 46, depending on how the rack 40 is deposited on the brackets. This selective height adjustment of rack 40 permits either bread slices, buns or sandwiches to be disposed between the two shells with their respective upper and lower surfaces at substantially the same distance from the heat sources.

In accordance with this invention, the heat sources are provided by two radiant heating elements 70 and 71 in the lower shell 22 and two radiant heating elements 72 and 73 in the upper shell 16. Advantageously, the heating elements may take the form of heating coils supported by the elongated ceramic rods 74. It is an important feature of the invention that the heating elements are located adjacent the sides of the respective perimeter walls and generally parallel thereto, as may be understood from FIGURE 3. Thus, the heating elements are positioned so as to be laterally offset from the area where the food is placed on the grill, such that any drippings from the toast fall down on a removable tray and do not cause any damage to the heating elements or to the working parts of the toaster. The toasting action of the offset heating elements is facilitated by radiant heat reflectors adapted to focus the radiant heat for achieving even heating of both sides of the toast. Thus, as shown in FIGURE 3, each heating element is provided with a radiant heat reflector 73 arranged substantially parallel thereto for focusing the heat in a substantially uniform manner over the articles to be toasted. In lieu of the upper ceramic heating elements 72 and 73, a coiled heating element 74a, such as that disposed in the upper shell parallel to the front and back perimeter walls in FIGURE 4, may be used.

Returning now to the housing 24, it will be seen that it incorporates a vertically movable on-off switch 26 whose handle is shown in FIGURES 1 and 2, and a toast timing cycle control handle indicated at 28. The on-off switch 26 permits the operator to start the toaster at a desired time, while the handle 28 permits the operator to set the desired degree of toasting by moving the handle 28 to one of graduations indicated at the scale 30. The control housing 24 may additionally enclose therein a conventional thermal relay, for example, which reacts to a predetermined degree of heat for enabling the release of the latch element 32 and for terminating the toasting cycle, all in a well known manner. The timing cycle control handle 28 of course adjusts the period of time in which the thermal relay reacts. Also, located in the lower part of lower shell 22 and beneath the control housing 24 is a food particle receptacle or drip pan 27 having a handle 27a. The pan extends through an opening in the lower shell 22 so that it lies beneath the bread for catching food particles. It may be withdrawn from the lower shell for the purpose of removing such food particles.

The upper shell 16 is hingedly secured to the lower shell 22 by means of the hinges 48, as may be seen in FIGURES 2 and 5. This permits the upper shell 16 to be pivoted to an open position as shown in FIGURE 2 and by the dot-dash lines in FIGURE 6. The upper shell is normally biased into the open position by a coil spring means 50 which is secured to the lower shell by brackets 53 and to the upper shell by the bracket 55, best seen in FIGURE 5. The degree of opening that is permitted may be controlled by selection of the height of bracket 68, as it will be seen that engagement of the upper edge of bracket 68 with the upper shell will limit opening of the upper shell past a predetermined position. In addition, the rear legs 15a supporting the toaster may be made somewhat longer than the front legs 15 to provide a greater support area and to avoid any danger of the toaster tipping upon movement of the upper shell 16 to the open position.

Since heating elements are disposed in both the upper and lower shells, and since it is necessary to provide electrical connections between such heating elements and the power supply, appropriate pairs of contact blades, shown at 60–61, 62–63, and 64–65, are provided in accordance with a feature of this invention. The blades 60 and 61 on shell 22 are normally spaced from each other when upper shell 16 is in the open position. Blades 62 and 64 are carried on lower shell 22 and blades 63 and 65 are carried on upper shell 16. A blade deflector 66 of insulating material is carried by upper shell 16 and is positioned to move contact blade 61 against contact blade 60 when the device is closed, while substantially simultaneously the blades 63 and 65 on upper shell 16 move into contacting engagement respectively with blades 62 and 64 carried by lower shell 22. The various blades 60–65 are each carried by insulating elements 67 mounted on the shells 16 and 22.

FIGURE 7 illustrates the wiring diagram of the oven toaster and shows the simple means for making the electrical connections between the upper shell and the lower shell, without using troublesome lead wires that might flex and break when the toaster is opened and closed by use over a long period of time. The structure illustrated in FIGURES 5 and 6, when taken in conjunction with the wiring diagram of FIGURE 7 also illustrates the simple method of disconnecting both sides of the supply line when the upper shell 16 of the toaster is in the opened position. It is advantageous to disconnect both sides of the appliance when it is in the opened position because, in use, a person may think that, with the toasting cycle timed out or with the device in an "off" condition, the heating element is completely de-energized because it is not glowing. If the person then wishes to clean the appliance or remove pieces of toast with a fork, the person may inadvertently touch the heating element with the fork and may get an electrical shock in so doing. However, when both sides of the electrical supply line are de-energized, there is no possibility of getting a shock even if the user touches the heating element with a metallic implement.

FIGURE 7 illustrates that the heating elements are preferably in a series circuit. When the upper shell 16 is in the opened position, then spring contact blades 63 and 65 thereon are swung away from spring contact blades 62 and 64 respectively, to de-energize the heating elements in the upper shell. At the same time, the insulating blade deflector 66 moves away from engagement with spring blade 61, thereby permitting that blade to separate from contact with the blade 60 and operating to disconnect the other side of the supply line. This design successfully eliminates flexing lead wires, assures longer life to the device, and eliminates all shock hazard by de-energizing both sides of the supply line when the toaster is in opened position. It will be noted that any danger of a person coming in contact with portions of the electrical circuitry such as contacts 60–65, inclusive, is prevented by the cooperating shielding brackets 68 and 69 on shells 16 and 22 which act to completely enclose and shield these contacts.

It can now be seen that with the upper shell 16 in its open position, bread or buns or the like may be deposited on the rack 40 and supported at a desired position with respect to the heating elements 70–73. Thus, if buns or sandwiches are to be deposited on the rack, the rack is inverted from the position shown in FIGURE 2 and in this event the rack depends from brackets 46 as seen by the broken lines in FIGURE 3 or FIGURE 4. This arrangement supports the buns, indicated by the broken lines 86, with their opposite surfaces at substantially the same distance from the coils to enable uniform heating or toasting.

With rack 40 arranged as shown in FIGURE 2, thin bread slices may be positioned for toasting with respect to the heating elements or coils. The upper shell is then pivoted to its closed position. The latch element 32 enters opening 38 and contacts 60–61, 62–63, and 64–65 close. The operator now closes switch 26 after having set the toast cycle to a desired time period through manipulation of handle 28. A circuit is now completed as seen in FIGURE 7 from one side of the power supply connected to cable 12, through contacts 62 and 63, then through upper heating elements 72 and 73 in the upper shell, contacts 65 and 64, the lower heating element 71, the contacts of main control switch 26, then through the thermal relay and any other desired control elements in housing 26 (as indicated at 95), and through the lower heating element 70 to the other side of the power supply through contacts 61 and 60.

If the operator should desire to inspect the toast, he simply pivots the handle 20 to release the latch element 32 in any well known manner. The upper shell now rotates under the influence of spring means 50 so that the toast may be visually inspected. If further toasting is desired, shell 16 is again pivoted downwardly to engage the latch element 32 and close the device.

When the toast has reached the desired degree of toasting, the thermal relay operates to automatically release the latch 32. The spring 50 rotates the upper shell 16 about the hinges 48 to permit access to the toast. The contacts 60–61, 62–63, and 64–65 then open and the circuit is completely disconnected. The operator may now reach his hand inside the toaster to remove the bread without danger. In addition, he may clean the interior of the toaster without danger, even if carrying a metallic element. To remove any food or butter drippings, the operator simply pulls out the tray 24 and empties the same. Again, it will be noted that the coils 70 and 71 are free from danger of contamination due to their offset relationship at the sides of the lower shell with respect to the toasted articles on the rack.

It will be noted that the radiant heat reflectors 78 are each arranged to reflect heat over an angle indicated by the broken lines 79 in FIGURE 3. This encompasses an area large enough to overlap more than one bread slice so that the heat from several reflectors may reinforce each other where needed. In addition, a radiant heat reflective surface is provided at 83 in the upper shell and, if desired, the inner surface of tray 24 may likewise be so provided as indicated at 83a. The heat generated with this system may be quite considerable and therefore venting may be provided. Advantageously, therefore, the upper shell 16 in its closed position may be arranged to be spaced apart from the lower shell 22. Additionally, an elongated slot 19, serving as vent means, is provided in the rear of the upper shell, as shown in FIGURE 5 and at the opening 38 in control housing 24. The control housing 24 is provided with vents (not shown) at its bottom side to permit air circulation therethrough. The venting, of course, prevents the excessive accumulation of heat especially in the housing 24 so that the thermal relay may be cooled to the same point at the beginning of each successive toasting cycle. This prevents erratic toast cycles.

Thus, I have described a novel toasting arrangement in which buttered bread or like may be disposed horizontally and toasted by radiant heat without danger of contaminating the horizontally disposed coils together with various safety features which cooperate to make the arrangement even more advantageous in use.

While there has been shown and described a specific embodiment of the present invention, it will, of course, be understood that various modifications and alternative constructions may be made without departing from the true spirit and scope of the invention. Therefore, it is intended by the appended claims to cover all such modifications and alternative constructions as fall within their true spirit and scope.

What is claimed as the invention is:

1. A toaster comprising a lower horizontally-disposed shell adapted to carry bread or the like in a horizontally disposed position, an upper shell movably carried by said lower shell for forming a toasting chamber for said bread when said upper shell is moved to a closed position adjacent said lower shell, means in said lower shell for supporting bread to be toasted, elongated heating coil means disposed in said lower shell adjacent the edges thereof and spaced beyond the vertically downward projected area in which the bread is disposed, whereby said coils are outside of the space through which butter or other food remnants may drop from said bread, a radiant heat reflector for each coil arranged to reflect heat cast by said coil means toward said supporting means for insuring the even disposition of heat across the surface of said bread supported on said supporting means, the major portion of said heat reflector being spaced beyond said vertically downward projected area, and a removable tray located between said coil means in said lower shell for receiving the food particles that drop from said bread and affording removal of such particles from said toaster.

2. An electric toaster comprising, in combination, a horizontally disposed shell, spaced elements carried on said shell and serving as spaced supports, a grill member defined by a plurality of spaced elements, said grill member defining a central horizontal support area adapted to receive thereon a bread slice or the like and support ends for engaging and being supported on said spaced supports, a plurality of radiant heat emanating heating elements carried within said shell and positioned laterally outside the vertically projected confines of the central support area of the grill member, said heating elements being spaced from the plane of said grill member and being arranged so that there is an unobstructed straight line path, inclined to the vertical, for radiant heat direct from said heating elements to the said central support area of the grill member, whereby the radiant heat from the heating elements emanates at and through said grill member, and whereby said heating elements are substantially protected from contamination moving vertically from toasting objects positioned on said central support area of the grill member, reflector means closely adjacent each heating element for directing and reflecting additional radiant heat toward said central support area of the grill member, and means for selectively energizing said heating elements.

3. An electric toaster as in claim 2 including a second shell hinged to and oppositely facing said horizontally disposed shell with said grill member positioned between said shells, and electrically energizable heating means for toasting carried in said second shell.

4. An electric toaster as in claim 2 wherein said grill member is shaped so that the support ends are in one plane and the central support area thereof, for support of the object to be toasted, is in a second plane spaced from and parallel to said first plane, so that upon mere inversion of the grill member, there is obtainable a two position spacing between said central support area and the heating elements carried within the shell.

5. An electric toaster as in claim 2 wherein the plurality of radiant heat emanating heating elements consists of two spaced heating elements located vertically below said spaced supports, and there being a removable tray supported on the shell between said spaced heating elements.

6. An electric toaster as in claim 2 wherein the heating elements are elongated elements and the reflector means are elongated transversely curved spaced apart elements arranged to substantially avoid contamination from the products being toasted and so that they will distribute the reflected heat radiation over the entire central support area of the grill member.

References Cited in the file of this patent

UNITED STATES PATENTS

| 1,952,763 | Lux | Mar. 27, 1934 |
| 1,973,175 | McArdle | Sept. 11, 1934 |
| 2,099,152 | Walder | Nov. 16, 1937 |
| 2,936,697 | Kueser | May 17, 1960 |
| 3,002,444 | Hoebing | Oct. 3, 1961 |

FOREIGN PATENTS

| 4,479 | Great Britain | Feb. 23, 1909 |
| 131,679 | Sweden | May 15, 1951 |